United States Patent [19]

Sakane et al.

[11] Patent Number: 5,447,364
[45] Date of Patent: Sep. 5, 1995

[54] ANTI-SKID CONTROL SYSTEM FOR REAR WHEELS

[75] Inventors: Shinsuke Sakane, Toyota; Hiroyuki Ichikawa, Okazaki; Satoru Fukushima, Chiryu; Chiaki Hamada, Susono, all of Japan

[73] Assignee: Aisin Seiki Kabushiki Kaisha, Kariya, Japan

[21] Appl. No.: 298,970

[22] Filed: Sep. 2, 1994

Related U.S. Application Data

[63] Continuation of Ser. No. 12,750, Feb. 3, 1993, abandoned.

[30] Foreign Application Priority Data

Feb. 6, 1992 [JP] Japan .................. 4-056908

[51] Int. Cl.$^6$ .................................................. B60T 8/58
[52] U.S. Cl. .................................. 303/169; 303/113.5
[58] Field of Search ............... 303/100, 111, DIG. 3, 303/DIG. 4, 9.62, 95, 113.5; 364/426.02

[56] References Cited

U.S. PATENT DOCUMENTS

| | | | |
|---|---|---|---|
| 4,852,009 | 7/1989 | Jonner et al. | 303/111 |
| 4,881,785 | 11/1989 | Ushijima et al. | 303/111 |
| 5,015,041 | 5/1991 | Kuwana et al. | 303/95 |
| 5,134,352 | 7/1992 | Matsumoto et al. | 303/92 |
| 5,172,961 | 12/1992 | Inoue et al. | 303/111 |
| 5,188,432 | 2/1993 | Schmitt et al. | 303/96 |
| 5,188,434 | 2/1993 | Ruf et al. | 303/111 |
| 5,207,483 | 5/1993 | Shimada | 303/111 |
| 5,224,765 | 7/1993 | Matsuda | 303/111 |

FOREIGN PATENT DOCUMENTS

| | | | |
|---|---|---|---|
| 1-182156 | 7/1989 | Japan . | |
| 1-301450 | 12/1989 | Japan . | |
| 3-186464 | 8/1991 | Japan | 303/113.5 |
| 3-246150 | 11/1991 | Japan | 303/113.5 |
| 3-246152 | 11/1991 | Japan | 303/113.5 |

*Primary Examiner*—Matthew C. Graham
*Attorney, Agent, or Firm*—Burns, Doane, Swecker & Mathis

[57] ABSTRACT

The invention is directed to an arrangement for controlling a braking force applied to each of road wheels of a vehicle depending upon a braking condition, with a hydraulic braking pressure supplied to each of the wheel brake cylinders through an actuator. The actuator is controlled by a braking force controller into which output signals of wheel speed sensors are fed. The hydraulic braking pressure applied to each of the wheel brake cylinders is controlled by the braking force controller in accordance with each wheel speed. And, it is determined whether the vehicle is turning or not. If the vehicle is turning, the hydraulic braking pressure in a wheel brake cylinder operatively connected to one of the rear road wheels positioned at the outer side is controlled such that a decreasing operation of the pressure is restrained for at least a predetermined time period.

7 Claims, 8 Drawing Sheets

ANTI-SKID CONTROL SYSTEM FOR REAR WHEELS

This application is a continuation of application Ser. No. 08/012,750, filed Feb. 3, 1993, now abandoned.

BACKGROUND OF THE INVENTION

1. Field of the Invention

The present invention relates to an anti-skid control system for controlling braking force applied to road wheels in the braking operation of an automotive vehicle to prevent the road wheels from being locked, and more particularly to an anti-skid control system for providing a low-select simultaneous control mode for rear road wheels of the vehicle.

2. Description of the Prior Art

In order to prevent road wheels from being locked, there has been employed an anti-skid control system which controls the braking force by decreasing, increasing, or holding a hydraulic braking pressure supplied to each wheel brake cylinder operatively connected to each road wheel. According to the anti-skid control system, in general, a rotational speed of each road wheel or a wheel speed is detected, in response to which the hydraulic braking pressure in each wheel brake cylinder is controlled so as to obtain the maximum coefficient of friction. With respect to the rear road wheels of the vehicle, the braking force is applied simultaneously to both the rear road wheels, and a so-called low-select simultaneous control mode is provided for the rear road wheels. Namely, according to the low-select simultaneous control mode, a braking force, which is to be applied to one of the rear road wheels rotating at the lower speed and having a tendency to be locked first, is applied to both of the right and left rear road wheels simultaneously. In the anti-skid control system, as disclosed in the U.S. Pat. No. 5,015,041 for example, an independent control mode or the low-select simultaneous control mode is selected for a pair of road wheels such as the rear road wheels, depending upon a vehicle speed or a coefficient of friction of a road surface, to ensure a running stability and shorten a stopping distance.

In the case where the vehicle is turning, a lateral load shift occurs on the rear road wheels due to a centrifugal force. Therefore, a large load is applied to the rear road wheel at the outer side, and a load applied to the rear road wheel at the inner side is reduced, so that the inner side wheel has a large tendency to be locked. Consequently, in the case where a simultaneous control mode is set on the basis of the road wheel rotating at the lower speed, such as the low-select simultaneous control mode set for the rear road wheels, the braking force which should be applied to the road wheel at the inner side is reduced by a force shifted to the road wheel at the outer side due to the load shift.

SUMMARY OF THE INVENTION

Accordingly, it is an object of the present invention to provide an anti-skid control system which provides a low-select simultaneous control mode for rear road wheels of an automotive vehicle, and which prevents a braking force applied to one of the rear road wheels from being reduced due to a load shift, which occurs when the vehicle turns, to ensure an appropriate braking operation for the rear road wheels.

In accomplishing the above and other objects, an anti-skid control system for an anti-skid control system for controlling a braking force applied to road wheels of an automotive vehicle comprises wheel brake cylinders operatively connected to right and left road wheels at front and rear sides of the vehicle, respectively, for applying braking force thereto, a hydraulic pressure generator for supplying a hydraulic braking pressure to each of the wheel brake cylinders, actuating means which is disposed in each hydraulic circuit communicating the hydraulic pressure generator with each of the wheel brake cylinders for controlling the hydraulic braking pressure in each of the wheel brake cylinders, and wheel speed detecting means for detecting a wheel speed of each of the road wheels, and providing an output signal corresponding to the wheel speed respectively. The anti-skid control system is provided with braking force control means for controlling the actuating means in response to the output signal of the wheel speed detecting means to control the braking force applied to each of the road wheels. The braking force control means is arranged to control the hydraulic braking pressure in each of the wheel brake cylinders operatively connected to the rear road wheels in response to the wheel speed of one of the rear road wheels rotating at the lower speed than the other one of the rear road wheels. Turn determination means is provided for determining whether the vehicle is turning or not, and decrease restraining means is provided for restraining a decreasing operation of the hydraulic braking pressure by the braking force control means for one of the wheel brake cylinders operatively connected to one of the rear road wheels positioned at the outer side for at least a predetermined time period, when it is determined by the turn determination means that the vehicle is turning.

In the above-described anti-skid control system, the turn determination means is preferably arranged to determine whether the vehicle is turning or not in response to the output signal of the wheel speed detecting means. The turn determination means may determine that the vehicle is turning, when a first difference speed between a wheel speed of one of the rear road wheels rotating at the higher speed and a wheel speed of the other one of the rear road wheels rotating at the lower speed is greater than a first predetermined value, and a second difference speed between the wheel speed of the rear road wheel rotating at the higher speed and a wheel speed of one of the front road wheels positioned diagonally to the rear road wheel rotating at the higher speed is greater than a second predetermined value.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
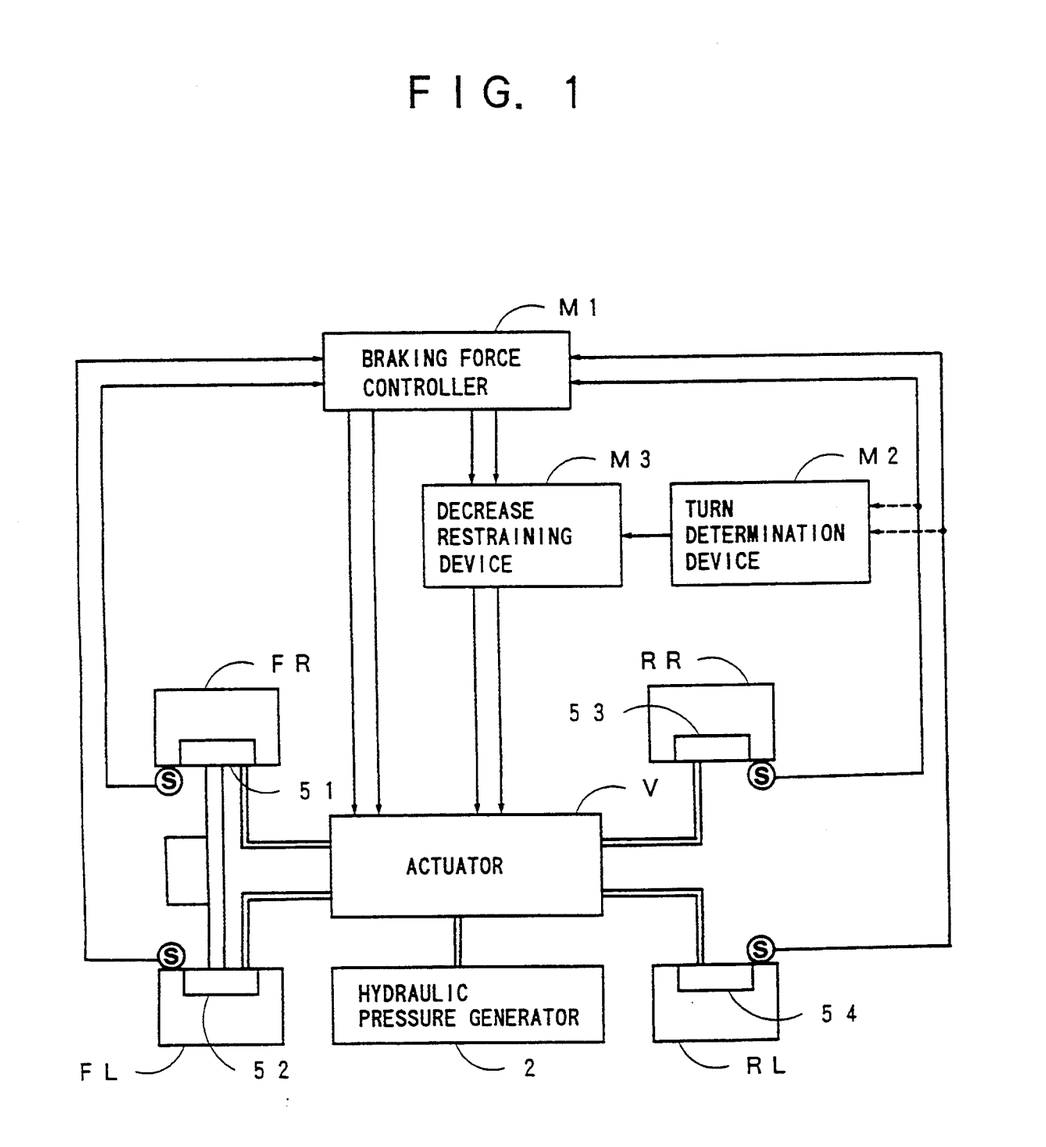
FIG. 1 is a general block diagram illustrating an anti-skid control system according to the present invention.

Referring to FIG. 1, there is schematically illustrated an anti-skid control system according to the present invention, which controls a braking force applied to each of the right and left front road wheels FR, FL and right and left rear road wheels RR, RL of a vehicle depending upon a braking condition. In this anti-skid control system, it is so arranged that when the hydraulic pressure generator 2 is operated, a hydraulic braking pressure is supplied from a pressure generator to each of wheel brake cylinders 51 to 54 through an actuator V, so that a braking force is applied to each of the road wheels FR, EL and RR, RL. And, a wheel speed of each of the front road wheels FR, FL, RR, RL is detected by wheel speed sensors S, respectively. The actuator V is controlled by the braking force controller M1, into which output signals of the wheel speed sensors S are fed. The hydraulic braking pressure applied to each of the wheel brake cylinders is controlled by the braking force controller M1 in response to the wheel speed of one of the rear road wheels RR, RL rotating at a lower speed than the other one of the rear road wheels RR, RL. A turn determination device M2 determine whether or not the vehicle is turning. If the vehicle is turning, the hydraulic braking pressure in a wheel brake cylinder operatively connected to one of the rear road wheels RR, RL positioned at the outer side is controlled such that a decreasing operation of the pressure is restrained by a decrease restraining device M3 for at least a predetermined time period.

Figure 2:
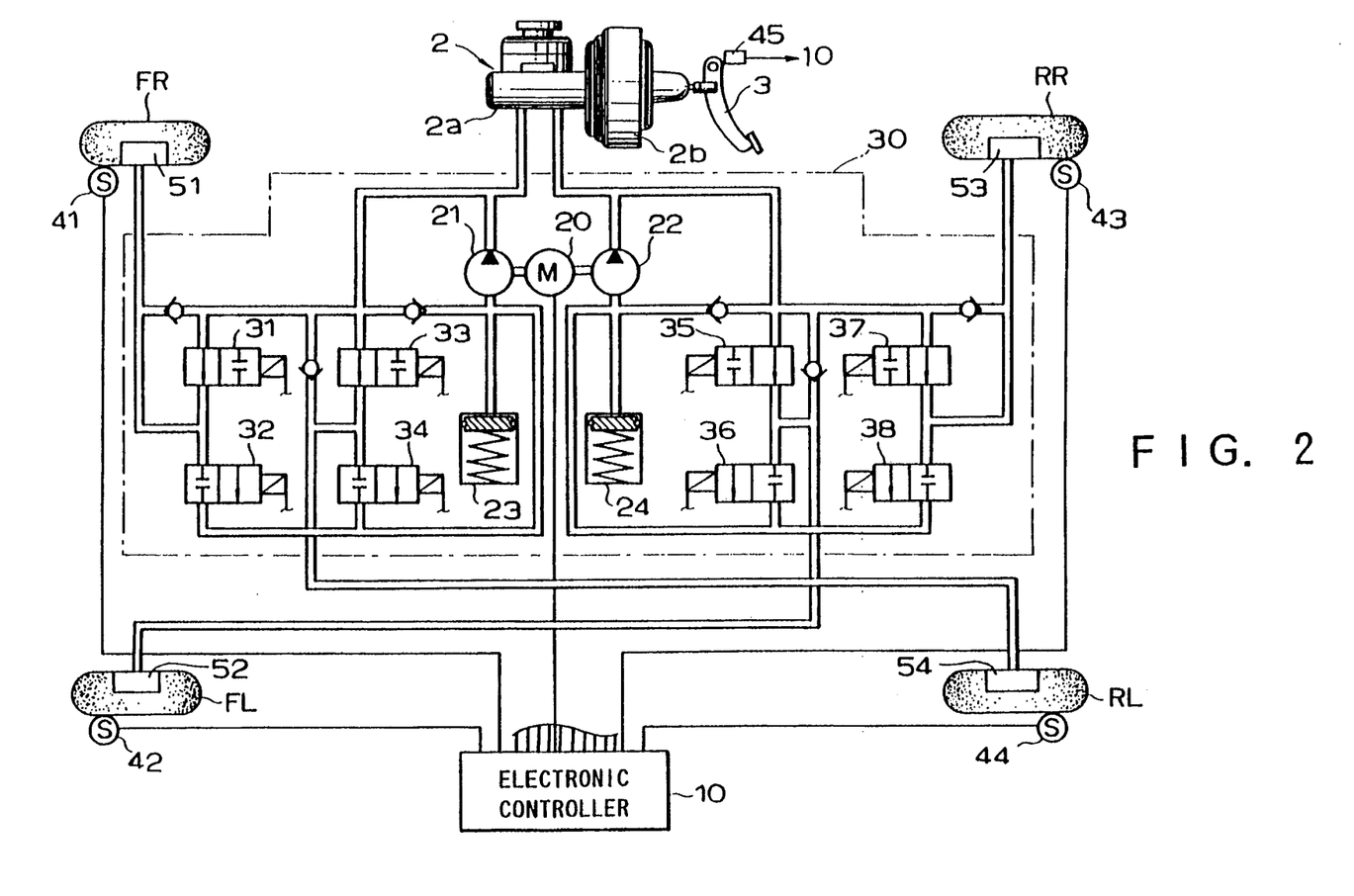
FIG. 2 is a schematic block diagram of an anti-skid control system of an embodiment of the present invention.

More specifically, an embodiment of the present invention is illustrated in FIGS. 2 to 6. Referring to FIG. 2, pumps 21, 22, reservoirs 23, 24 and solenoid valves 31 to 38 are disposed in hydraulic circuits for connecting a hydraulic pressure generator 2, which comprises a master cylinder 2a and a booster 2b operated in response to depression of a brake pedal 3, to wheel brake cylinders 51 to 54 operatively connected to the road wheels FR, FL, RR and RL, respectively. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. As shown in FIG. 2, a diagonal hydraulic circuit system has been formed.

Between the hydraulic pressure generator 2 and wheel brake cylinders 51 to 54, there is disposed an actuator 30 which corresponds to the actuator V in FIG. 1. The actuator 30 includes the solenoid valves 31, 32 and solenoid valves 33, 34 which are disposed respectively in the hydraulic circuits for connecting one output port of the master cylinder 2a to the wheel brake cylinders 51, 54, and the pump 21 is disposed between the master cylinder 2a and the solenoid valves 31 to 34. Similarly, the solenoid valves 35, 36 and solenoid valves 37, 38 are disposed respectively in the hydraulic circuits for connecting the other output port of the master cylinder 2a to the wheel brake cylinders 52, 53, and the pump 22 is disposed between the master cylinder 2a and the solenoid valves 35 to 38. The pumps 21, 22 are driven by an electric motor 20, so that brake fluid raised to a predetermined pressure is supplied to these hydraulic circuits. Accordingly, these hydraulic circuits serve as the circuits through which the hydraulic braking pressure is supplied to the normally open solenoid valves 31, 33, 35 and 37. The hydraulic circuits at the drain side of the normally closed solenoid valves 32, 34 are connected to the pump 21 through the reservoir 23, and the hydraulic circuits at the drain side of the solenoid valves 36, 38 are connected to the pump 22 through the reservoir 24. Each of the reservoirs 23, 24 is provided with a piston and a spring, and functions so as to store the brake fluid returned from each of the solenoid valves 32, 34, 36 and 38 through the hydraulic circuits at the drain side thereof, and to supply the brake fluid to each of those solenoid valves when the pumps 21, 22 operate.

Each of the solenoid valves 31 to 38 is a two port-two position solenoid operated changeover valve, and is in its first operating position as shown in FIG. 2 when a current is not fed to its solenoid coil, so that each of the wheel brake cylinders 51 to 54 is communicated with the hydraulic pressure generator 2 and the pump 21 or 22. When the current is fed to the solenoid coil, each solenoid valve is changed over to its second operating position, so that each of the wheel brake cylinders 51 to 54 is shut off from communication with the hydraulic pressure generator 2 and the pump 21 or 22, and is communicated with the reservoir 23 or 24. Check valves shown in FIG. 2 permit the brake fluid to return from each of the wheel brake cylinders 51 to 54 and the reservoirs 23, 24 to the hydraulic pressure generator 2, and blocks the counterflow of the brake fluid.

Accordingly, with each of the solenoid valves 31 to 38 energized or de-energized, the hydraulic braking pressure in each of the wheel brake cylinders 51 to 54 is decreased, held or increased. Namely, when the current is not fed to the solenoid coil of each of the solenoid valves 31 to 38, the hydraulic braking pressure is supplied from the hydraulic pressure generator 2 and the pump 21 or 22 to each of the wheel brake cylinders 51 to 54 to increase the hydraulic braking pressure in each wheel brake cylinder. On the other hand, when the current is fed to the solenoid coil, each of the wheel brake cylinders 51 to 54 is communicated with the reservoir 23 or 24 to decrease the hydraulic braking pressure in each wheel brake cylinder. Further, when the current is fed only to the solenoid coils of the solenoid valves 31, 33, 35 and 37, the hydraulic braking pressure in each wheel brake cylinder is held. Therefore, by adjusting the time intervals of energization and de-energization of the solenoid valves, it is possible to provide a so-called pulse-increase mode (step-increase mode) or a pulse-decrease mode so as to gradually increase or decrease the hydraulic braking pressure.

The above-described solenoid valves 31 to 38 are electrically connected to the electronic controller 10 which controls the operation of the solenoid valves 31 to 38. The electric motor 20 is also connected to the electronic controller 10, so that the operation of the electric motor 20 is controlled by the electronic controller 10. At the road wheels FR, FL, RR and RL, there are provided wheel speed sensors 41 to 44 respectively, which are connected to the electronic controller 10, and by which a signal corresponding to a rotational speed of each road wheel, i.e., a wheel speed signal is fed to the electronic controller 10. Each of the wheel speed sensors 41 to 44 in the present embodiment is a well known sensor of the electromagnetic induction type which comprises a pick-up having a coil wound around a permanent magnet and a rotor having an outer peripheral end thereof provided with teeth, and functions to output a voltage with a frequency proportional to the rotational speed of each road wheel. Further, a Hall IC or a photosensor or the like may be used for the wheel speed sensors 41 to 44, instead of the above-described sensor. There is also provided a brake switch 45 which is turned on when the brake pedal 3 is depreased, and turned off when the brake pedal 3 is released, and which is electrically connected to the electronic controller 10.

Figure 3:
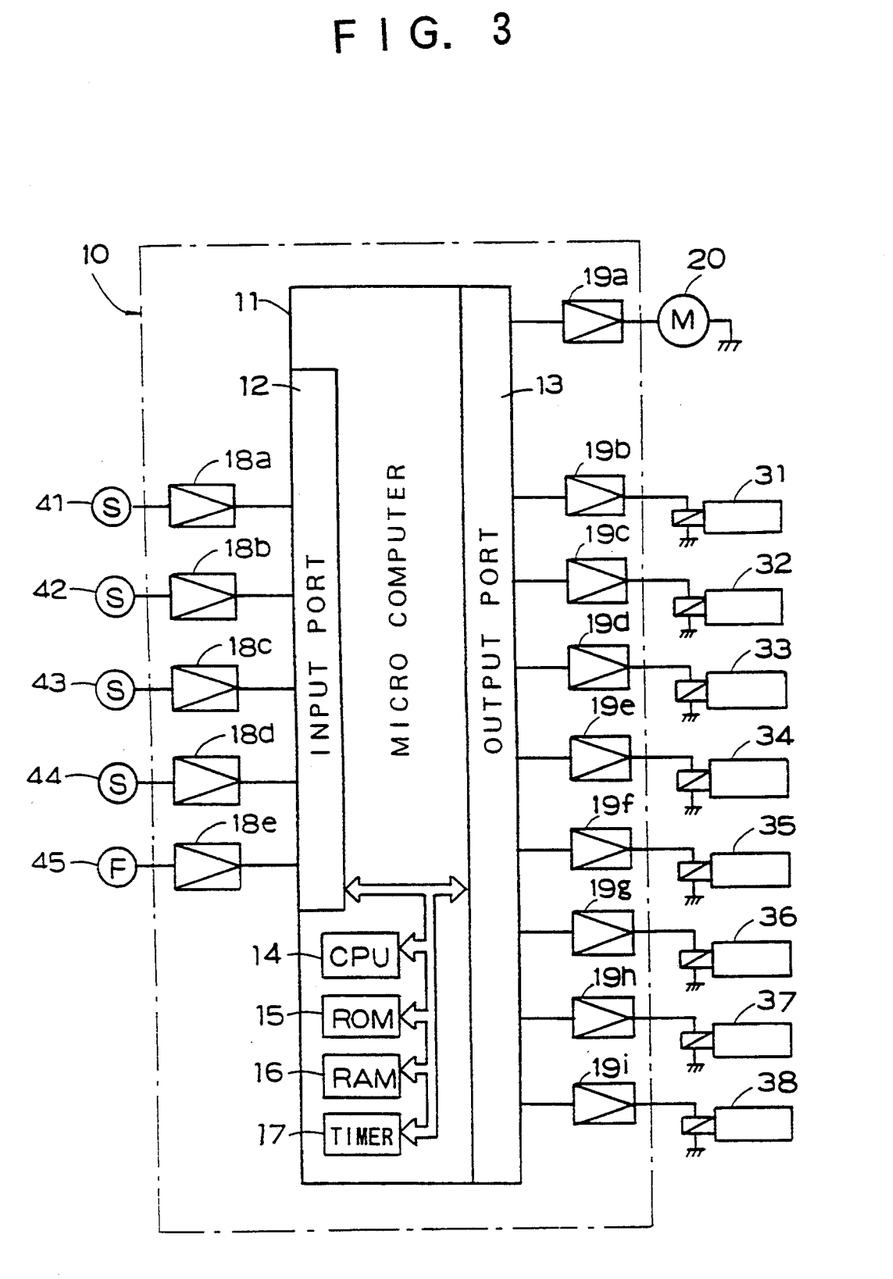
FIG. 3 is a block diagram illustrating the arrangement of an electronic controller shown in FIG. 2.

As shown in FIG. 3, the electronic controller 10 is provided with a microcomputer 11 having a central processing unit or CPU 14, a read-only memory or ROM 15, a random access memory or RAM 16 and a timer 17, which are connected with an input port 12 and an output port 13 via a common bus to execute the input/output operations relative to external circuits. The signals detected by each of the wheel speed sensors 41 to 44 and the brake switch 45 are fed to the input port 12 via respective amplification circuits 18a to 18e and then to the CPU 14. Then, a control signal is output from the output port 13 to the electric motor 20 via a drive circuit 19a, and control signals are output to the solenoid valves 31 to 38 via the respective drive circuits 19b to 19i. In the microcomputer 11, the ROM 15 memorizes a program corresponding to flowcharts shown in FIGS. 4 to 6, the CPU 14 executes the program while the ignition switch (not shown) is closed, and the RAM 16 temporarily memorizes variable data necessary for executing the program.

Figure 4:
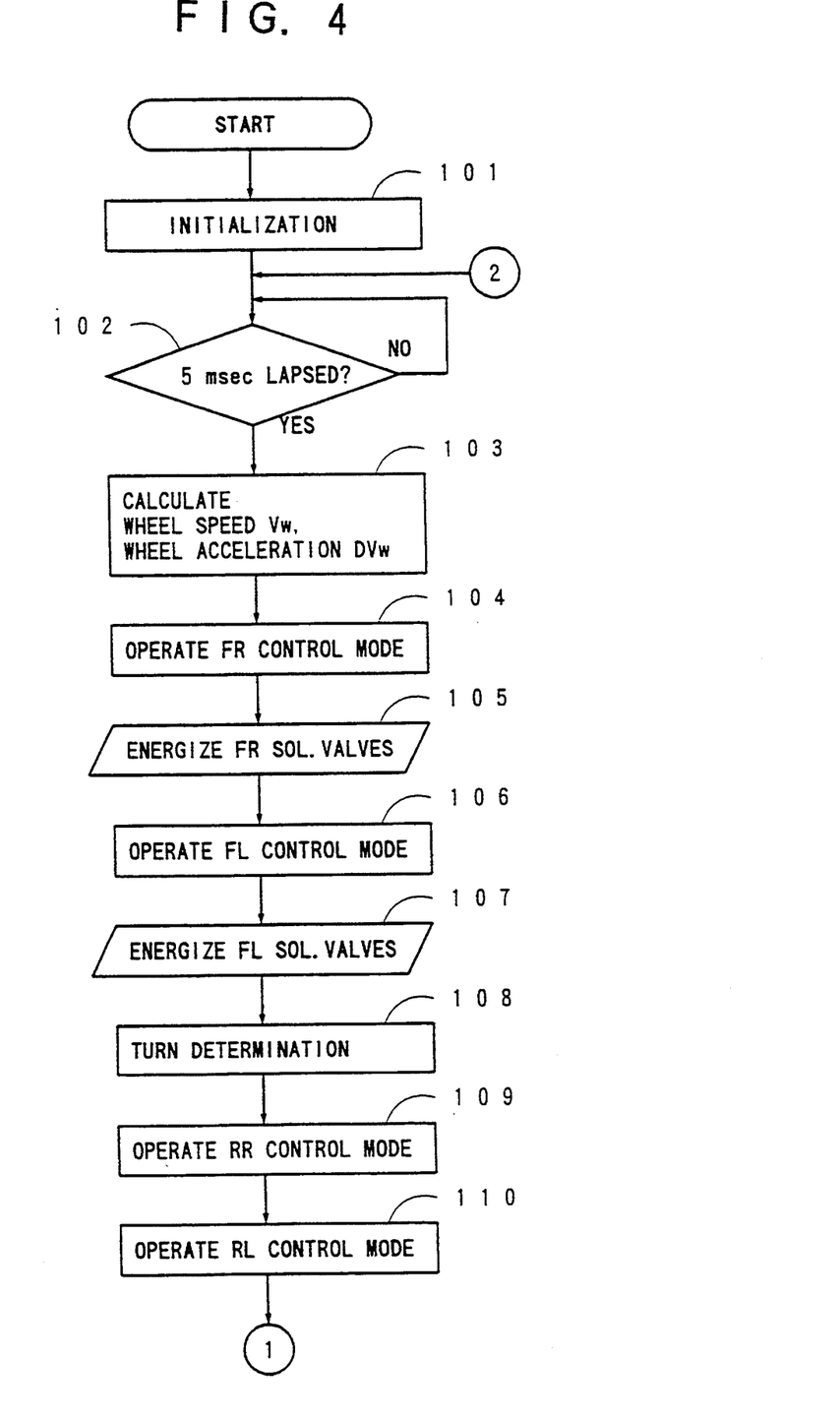
FIG. 4 is a flowchart showing the operation of the braking force control of the electronic controller according to an embodiment of the present invention.
Figure 5:
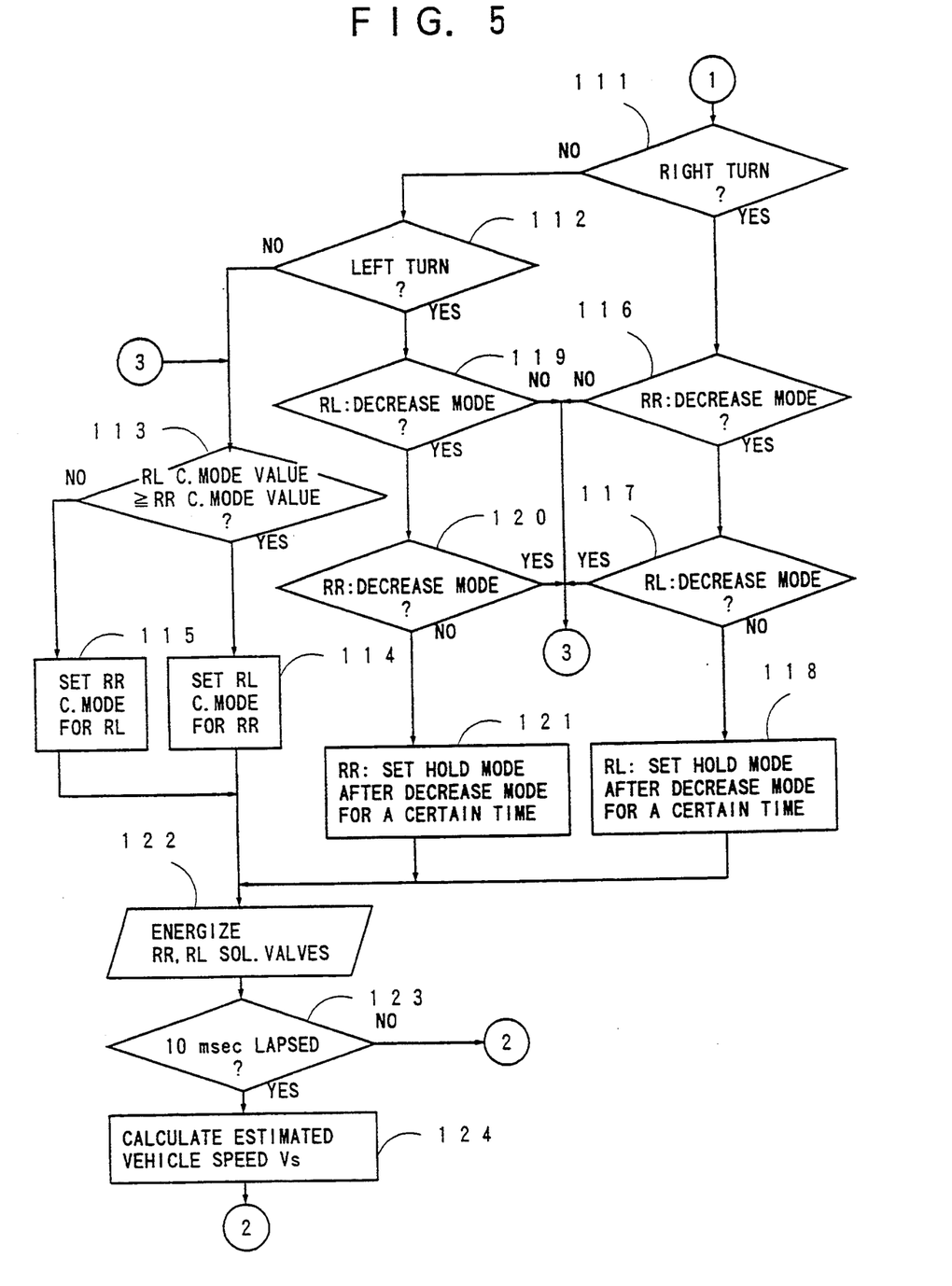
FIG. 5 is a flowchart showing the operation of the braking force control according to an embodiment of the present invention.
Figure 6:
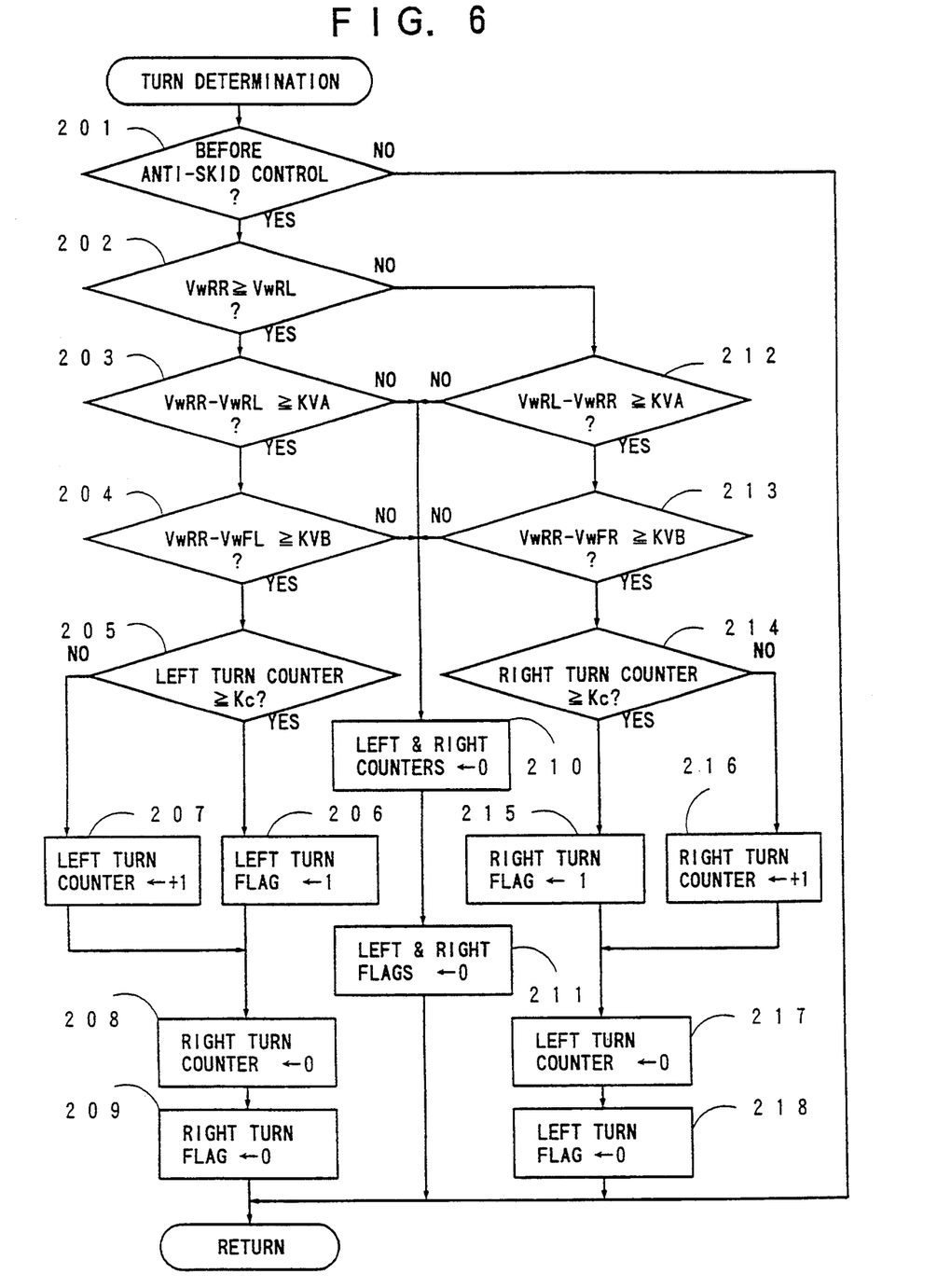
FIG. 6 is a flow chart of a turn determination in the braking force control according to the above embodiment.

A program routine executed by the electronic controller 10 for the anti-skid control will now be described with reference to FIGS. 4 to 6. FIG. 4 is a flowchart showing a main routine executed in accordance with a program of one embodiment of the present invention. The program routine corresponding to the flowcharts as shown in FIGS. 4–6 starts when an ignition switch (not shown) is turned on, and provides for initialization of the system at Step 101 to clear various data. At Step 102, is a waiting time is provided for setting a control cycle of 5 milliseconds. If it is determined that 5 milliseconds has elapsed, the program proceeds to Step 103 where the wheel speed Vw and wheel acceleration DVw are calculated in accordance with the output signal from each of the wheel speed sensors 41 to 44. Next, at Step 104, a control mode for the fore road wheel FR is operated, and the solenoid valves 31, 32 are actuated in accordance with the control mode at Step 105. That is, on the basis of the wheel speed Vw and wheel acceleration DVw of the road wheel FR and an estimated vehicle speed Vs which will be described later, one of a decrease mode, a hold mode, pulse-an increase mode and increase mode is selected, and the hydraulic braking pressure in the wheel brake cylinder 51 (simply referred to as the wheel cylinder pressure) is decreased, held or increased. Similarly, a control mode for the fore road wheel FL is operated at Step 106, and the solenoid valves 35, 36 are actuated in accordance with the control mode at Step 107. Thus, with respect to the front road wheels FR, FL, the hydraulic braking pressure control is made to provide an independent control for each front road wheel.

After finishing the control of the front road wheels FR, FL, a turn determination for determining whether the vehicle is in its right turn or left turn is made at Step 108, which will be described later with reference to FIG. 6. Then, at Steps 109 to 122, the hydraulic braking pressure controls for the rear road wheels RR, RL are made. After the control modes for the road wheels RR, RL are set at Steps 109 and 110, the program proceeds to Step 111 as shown in FIG. 5. At Steps 111 and 112, it is determined on the basis of the result of the determination at Step 108 whether the vehicle is in its right turn or left turn. If the vehicle is not turning, the program proceeds to Steps 113 to 115, where a low-select simultaneous control mode on the basis of the lower speed one of the rear road wheels RR, RL is achieved. Depending upon the control mode of each of the rear road wheels RR, RL, a numerical value of "3" is set for the decrease mode, "2" is set for the hold mode, "1" is set for the pulse-increase mode and "0" is set for the increase mode, respectively. And, at Step 113, it is determined which numerical value of the values for the wheels RR, RL is greater than the other value. If the control mode value (i.e., numerical value) for the wheel RL is equal to or greater than the control mode value for the wheel RR, it is determined that the wheel RL tends to be locked more than the wheel RR, so that the wheel RL is at a lower speed side. In this case, therefore, the control mode of the wheel RL is set for the wheel RR at Step 114. On the contrary, if the control mode value of the wheel RR is smaller than the control mode value of the wheel RL, the control mode of the wheel RR is set for the wheel RL at Step 115.

If it is determined at Step 111 that the vehicle is turning to the right, the program proceeds to Step 116, where it is determined whether the decrease mode has been set for the wheel RR at the inner side. If it is affirmative at Step 116, the program proceeds to step 117, where the decrease mode is set for the wheel RL at the outer side. If the decrease mode is not set for the wheel RL, the program proceeds to Step 118 where the decrease mode is set for a certain time period t1 (e.g., 10 milliseconds), and then the hold mode is set. If it is determined at Step 116 that the decrease mode has not been set for the wheel RR, it is determined that the wheel speeds of both the wheels RR and RL are being recovered, so that the program proceeds to Step 113 where the low-select simultaneous control mode is made. Or, if it is determined at Step 116 that the decrease mode has been set for the wheel RR, and if it is determined at Step 117 that the decrease mode has been set for the wheel RL, then it is determined that both the wheels RR and RL tend to be locked, so that the program proceeds to Step 113 where the low-select simultaneous control mode is made. Further, if it is determined at Step 112 that the vehicle is turning to the left, the program proceeds to Steps 119 to 121, where the control mode is set in the same manner as described above, while being opposite with respect to the wheels RR, RL.

After the control modes are set for the rear road wheels RR, RL, the program proceeds to Step 122, where driving signals are fed to the solenoid valves 33, 34 and the solenoid valves 37, 38, depending upon the control modes set therefor, respectively. Then, at Step 123, it is determined whether a time period of 10 milliseconds has elapsed, and if not, the program returns to Step 102, whereas if the period of 10 milliseconds has elapsed, the program proceeds to Step 124, where the estimated vehicle speed Vs is calculated and then returns to Step 102. The, estimated vehicle speed Vs is calculated as follows. A vehicle speed in the braking operation is set to a value calculated on the assumption that the vehicle speed is reduced with a predetermined deceleration from the vehicle speed corresponding to the wheel speed in the braking operation. Then, if the wheel speed of any one of four road wheels exceeds the wheel speed corresponding to the vehicle speed as set above, the vehicle speed is reset to a value calculated on the assumption that the vehicle speed of the value previously set is reduced with the predetermined deceleration again from the vehicle speed corresponding to the exceeded wheel speed.

FIG. 6 shows a subroutine of Step 108 in FIG. 4 for the turn determination, which will be described hereinafter. At the outset, it is determined at Step 201 whether the anti-skid control has been initiated. If it is determined that the anti-skid control has not been initiated yet, the program proceeds to Step 202, whereas if the anti-skid control has been initiated, the program returns to the main routine. Thus, before the initiation of the anti-skid control, the wheel speed VwRR of the fore right road wheel RR and the wheel speed VwRL of the fore left road wheel RL are compared. If it is determined that the wheel speed VwRR is equal to or greater than the wheel speed VwRL, the program proceeds to Step 203, where a difference between the wheel speed VwRR of the wheel RR at the higher speed side and the wheel speed VwRL of the wheel RL at the lower speed side, i.e., (VwRR-VwRL) is compared with a first predetermined value KVA (e.g., 2 km/h). If it is determined that the difference is equal to or greater than the value KVA, the program proceeds to Step 204, whereas if the difference is smaller than the value KVA, it is determined that the difference between the wheel speeds of the wheels RR and RL at the outer side and lower side is small, so that the program proceeds to Step 210 where a counter for determining right turn and left turn is cleared (0), and then to Step 211 where a turn determination flag is reset to be zero.

At Step 204, a difference between the wheel speed VwRR of the wheel RR at the higher speed side of the rear road wheels and the wheel speed VwFL of the wheel FL which is positioned diagonally to the wheel RR, i.e., (VwRR-VwFL) is compared with a second predetermined value KVB (e.g., 2 km/h). If this difference is equal to or greater than the value KVB, the program proceeds to Step 205, otherwise it is determined that the vehicle is not turning, so that the program proceeds to Steps 210, 211. At step 205, it is determined whether a certain time period Kc (e.g., Kc=20, which corresponds to 100 milliseconds) has elapsed. If the result is affirmative at Step 205, the program proceeds to Step 206 where a left turn determination flag is set to "1", and if it is negative, the program proceeds to step 207 where a left turn determination counter is incremented by one (+1), and then proceeds to Steps 208, 209. Namely, in this case, the vehicle is not turning to the right, so that a right turn determination counter is cleared (0), and a right turn determination flag is reset to be zero. The Steps 212-218 are the same as the Steps 203-209, except that they are in the opposite relationship with Steps 203-209 with respect to the right and left sides of that vehicle, so that their explanation will be omitted.

Figure 7:
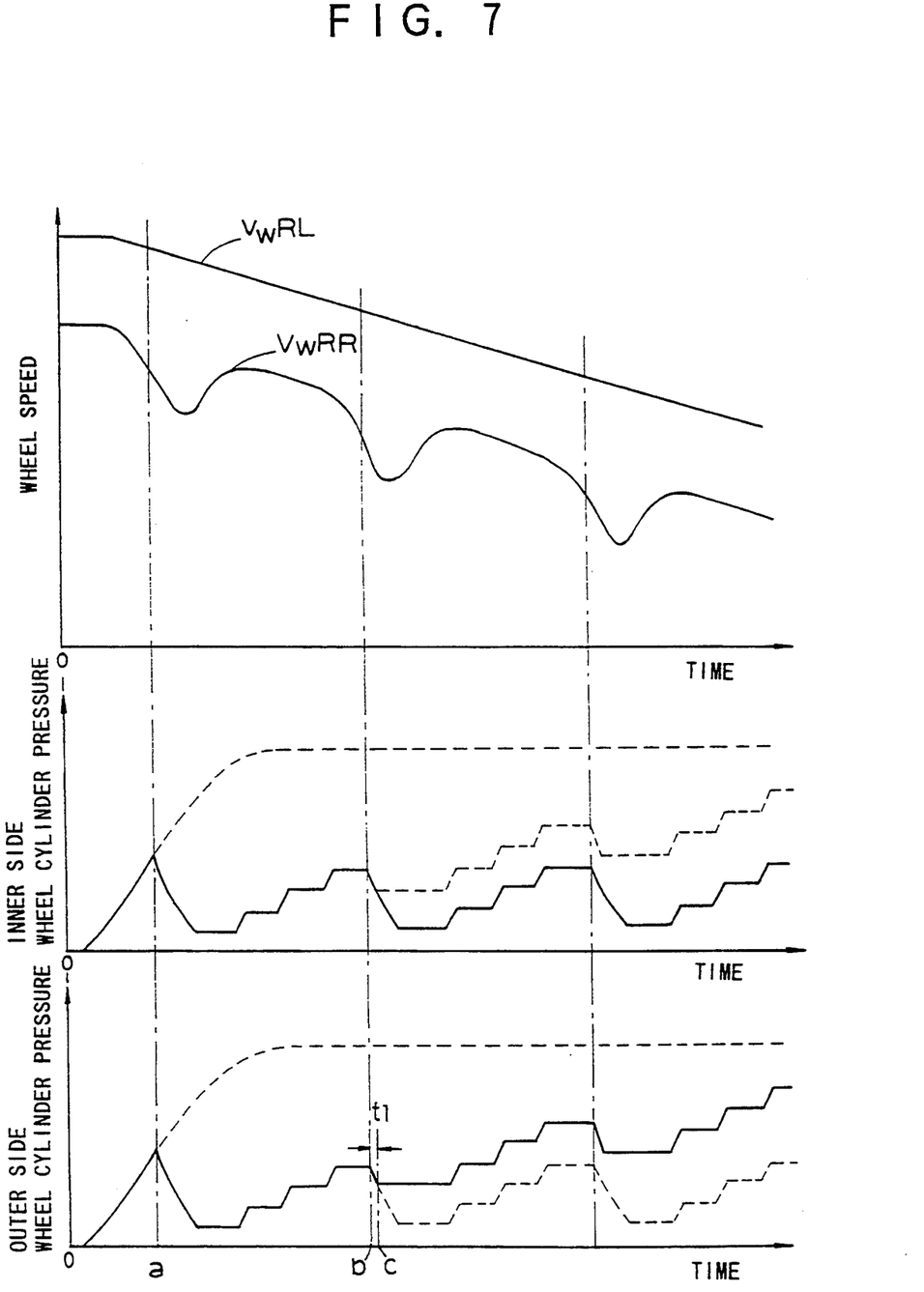
FIG. 7 is a diagram showing the variation of wheel speeds and wheel cylinder pressures of the rear road wheels during the anti-skid control operation in the above embodiment.

FIG. 7 illustrates the variation of the wheel cylinder pressures for the rear road wheels RR, RL according to the above-described embodiment. In the case where the wheel RL is at the outer side and the wheel RR is at the inner side, the wheel speed VwRR is reduced to a position "a" where the anti-skid control is initiated to begin decreasing the wheel cylinder pressure in the wheel brake cylinder 53 of the wheel RR, for example. In this case, according to the prior apparatus, the wheel cylinder pressures for the wheels RR, RL are set to the wheel cylinder pressure for the wheel at the inner side, in accordance with the low-select simultaneous control mode. However, according to the present embodiment, when the wheel speed reaches a position "b", the wheel cylinder pressure for the wheel RL at the outer side is set to the decrease mode for the certain time period t1, and set to the hold mode at a position "c". Consequently, the wheel cylinder pressure for the wheel RL at the outer side will be higher than the wheel cylinder pressure for the wheel RR at the inner side, so that a large braking force can be applied against a load shift which occurs when the vehicle turns, to thereby improve a deceleration rate.

Figure 8:
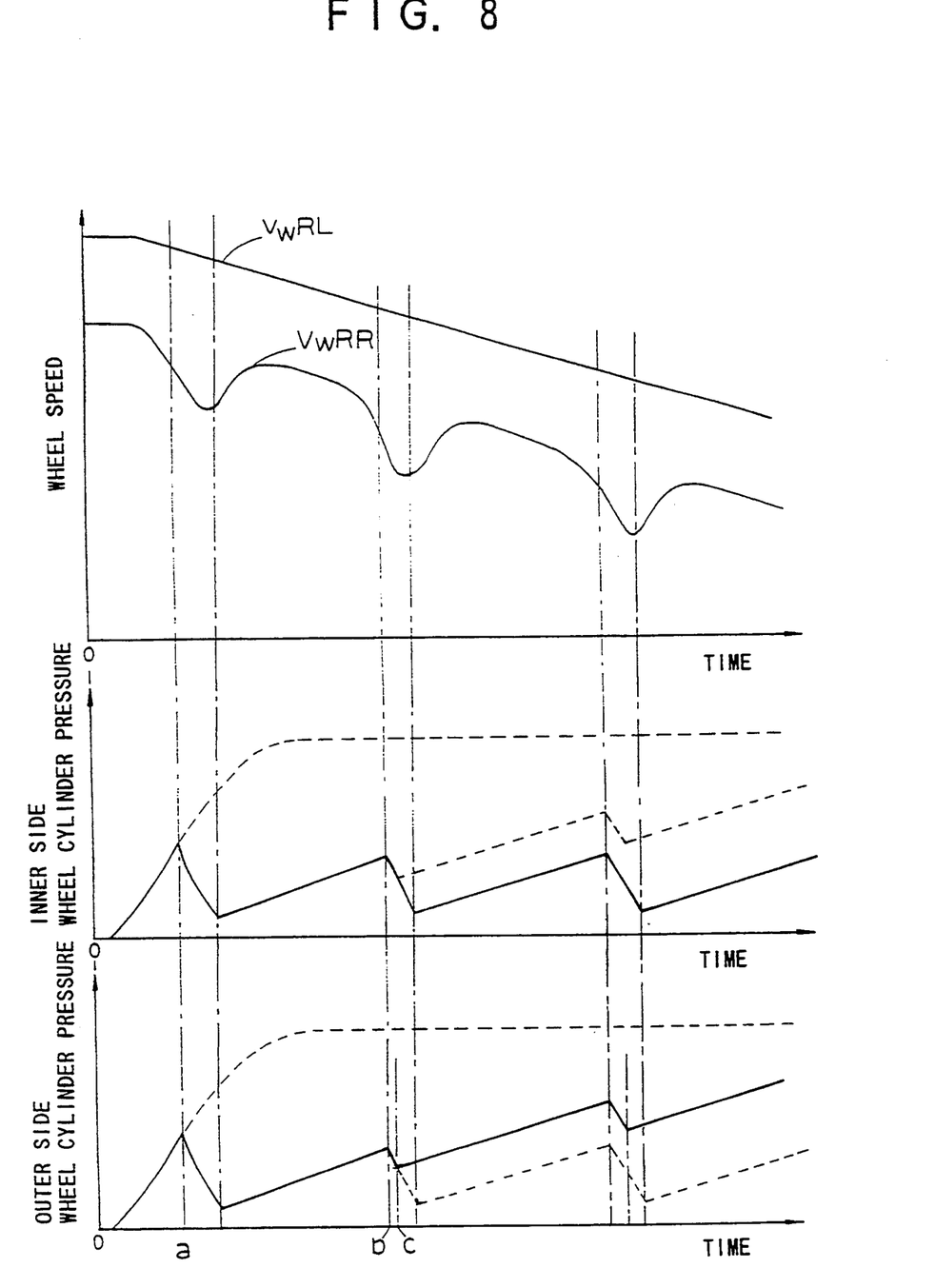
FIG. 8 is a diagram showing the variation of wheel speeds and wheel cylinder pressures of the rear road wheels during the anti-skid control operation in another embodiment of the present invention.

In FIG. 7, the system is arranged so that when the anti-skid control is initiated with respect to the wheel RR (at the position "a"), the wheel RL begins to be controlled in the same manner as the wheel RR in accordance with the low-select simultaneous control mode, and that the decrease mode is set for the wheel RR at the position "b" for the certain time period t1 and then the hold mode is set. This is because, it is necessary to distinguish a condition in which the vehicle is running on a split road from a condition in which the vehicle is turning to the right or left, for example, when the anti-skid control is initiated, to thereby prevent a misdetermination. FIG. 8 illustrates the variation of the wheel cylinder pressures for the rear road wheels RR, RL in the case where the gradual increase mode is set, in lieu of the pulse-increase mode set in the embodiment as shown in FIG. 7. Thus, the wheel cylinder pressures are increased gradually in FIG. 8.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for controlling a braking force applied to road wheels of an automotive vehicle, comprising:
   wheel brake cylinders operatively connected to right and left road wheels at front and rear sides of said vehicle, respectively, for applying braking force to the wheels;
   a hydraulic pressure generator for supplying a hydraulic braking pressure to each of said wheel brake cylinders;
   actuating means disposed in each hydraulic circuit communicating said hydraulic pressure generator with each of said wheel brake cylinders for controlling the hydraulic braking pressure in each of said wheel brake cylinders;

wheel speed detecting means for detecting a wheel speed of each of said road wheels, and for providing an output signal corresponding to said wheel speed of each respective road wheel;

braking force control means for controlling said actuating means in response to said output signal of said wheel speed detecting means to control the braking force applied to each of said road wheels, said braking force control means controlling the hydraulic braking pressure in each of said wheel brake cylinders operatively connected to said rear road wheels based on the wheel speed of one of said rear road wheels rotating at a lower speed than the other one of said rear road wheels;

turn determination means for determining whether or not said vehicle is turning; and decrease restraining means for restraining a decreasing operation of the hydraulic braking pressure by said braking force control means for one of said wheel brake cylinders operatively connected to one of said rear road wheels positioned at an outer side for at least a predetermined time period when it is determined by said turn determination means that said vehicle is turning.

2. An anti-skid control system according to claim 1, wherein said turn determination means determines whether or not said vehicle is turning in response to the output signal of said wheel speed detecting means, said turn determination means determining that said vehicle is turning when a first speed differential between a wheel speed of one of said rear road wheels rotating at a higher speed and a wheel speed of the other one of said rear road wheels rotating at a lower speed is greater than a first predetermined value, and a second speed differential between the wheel speed of said rear road wheel rotating at the higher speed and a wheel speed of one of said front road wheels positioned diagonally to said rear road wheel rotating at the higher speed is greater than a second predetermined value.

3. An anti-skid control system according to claim 2, wherein said turn determination means determines that said vehicle is turning when a time period, during which said first speed differential is greater then said first predetermined value and said second speed differential is greater than said second predetermined value, exceeds a predetermined time.

4. An anti-skid control system according to claim 1, wherein said decrease restraining means controls said braking force control means to decrease the hydraulic braking pressure in said wheel brake cylinder operatively connected to one of said rear road wheels positioned at the outer side for a certain time period when it is determined by said turn determination means that said vehicle is turning, and to increase the hydraulic braking pressure in said wheel brake cylinder operatively connected to one of said rear road wheels positioned at the outer side after lapse of said certain time period.

5. An anti-skid control system according to claim 4, wherein said braking force control means sets a pulse-increase mode to increase the hydraulic braking pressure in said wheel brake cylinder operatively connected to one of said rear road wheels positioned at the outer side after lapse of said certain time period.

6. An anti-skid control system according to claim 5, wherein said braking force control means sets a hold mode immediately after lapse of said certain time period to start said pulse-increase mode.

7. An anti-skid control system according to claim 4, wherein said braking force control means sets a gradual increase mode to increase the hydraulic braking pressure in said wheel brake cylinder operatively connected to one of said rear road wheels positioned at the outer side after lapse of said certain time period.

* * * * *